United States Patent [19]

Hurst

[11] 4,441,996
[45] Apr. 10, 1984

[54] APPARATUS FOR PRODUCING BACTERIA FREE DRINKING WATER

[76] Inventor: Richard F. Hurst, 126 Steeplechase Rd., Devon, Pa. 19333

[21] Appl. No.: 363,666

[22] Filed: Mar. 31, 1982

[51] Int. Cl.³ .............................................. B01D 39/00
[52] U.S. Cl. ...................................... 210/241; 210/244; 210/501; 222/215
[58] Field of Search ............... 210/351, 448, 452, 477, 210/480, 478, 501, 232, 244, 240, 416.3; D7/400; D23/4; 222/215; 55/388

[56] References Cited

U.S. PATENT DOCUMENTS

| 703,654 | 7/1902 | Hall | 210/416.3 |
| 1,750,073 | 3/1930 | Walsh | 210/351 |

FOREIGN PATENT DOCUMENTS 56-17617  2/1981  Japan .................................... 210/452

Primary Examiner—Charles N. Hart
Assistant Examiner—Sharon T. Cohen
Attorney, Agent, or Firm—John B. Sowell

[57] ABSTRACT

An apparatus for producing drinking water from bacteria contaminated cold water is provided. The cold contaminated water is placed into a flexible collector having a sub-micron porous filter in the bottom. When the flexible collector is squeezed, the pressure forces the contaminated water through the filter and into a holding chamber. The drinkable filtered water is removed from the holding chamber through a sterile exit opening.

10 Claims, 6 Drawing Figures

U.S. Patent    Apr. 10, 1984    4,441,996
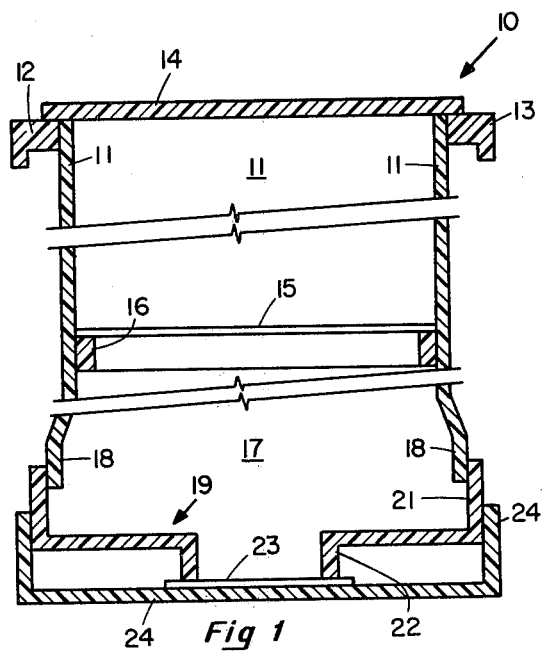
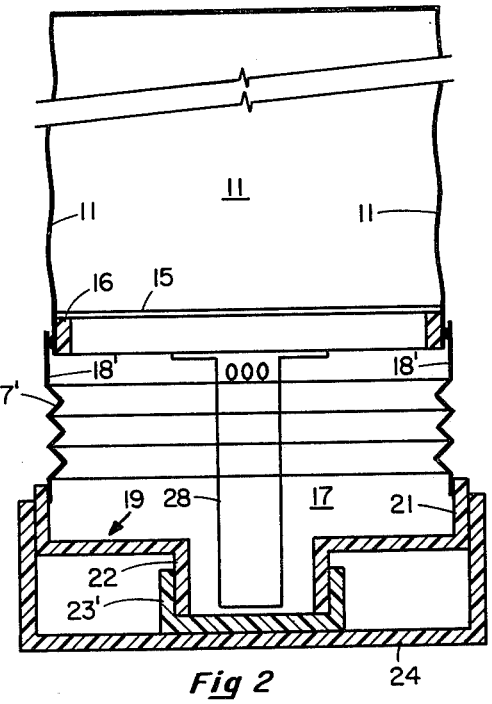
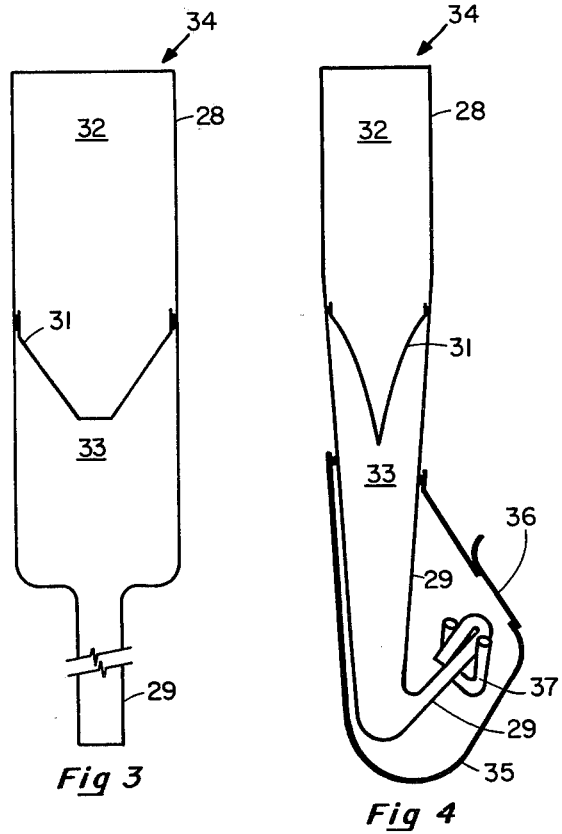
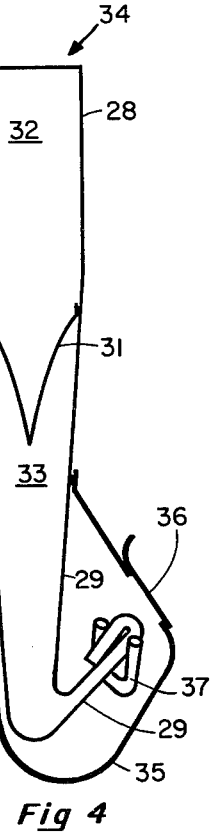
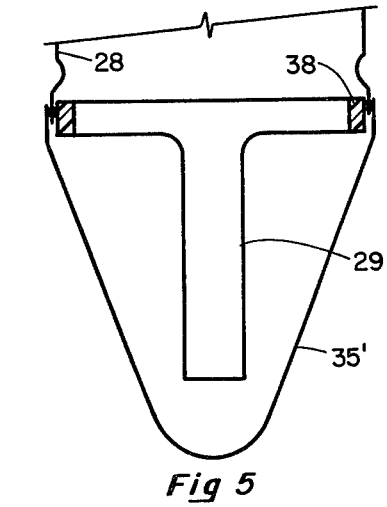
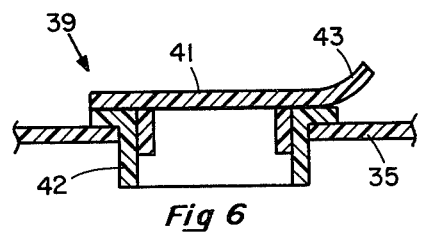

APPARATUS FOR PRODUCING BACTERIA FREE DRINKING WATER

BACKGROUND OF THE INVENTION

1. Field of the Invention

This invention relates to a novel apparatus for cold sterilization of contaminated water. More particularly, the novel apparatus is both portable and disposable and adapted to produce bacteria free drinking water from contaminated water.

2. Description of the Prior Art

When people are forced to survive in the wilds of nature, one of the most important rules of survival is to obtain a source of drinkable bacteria free water. Most bacteria in water can be killed by boiling the water, however, it is not always possible under survival conditions to have the proper equipment to sterilize contaminated water. It has been suggested that rain water be collected and used in emergency situations, however, rain water is contaminated by atmospheric polutants and is further contaminated by whatever collection device is employed to catch the rain water if and when it may rain.

Cold water additives have been developed which may be added to contaminated water and are effective to kill some, but not all, forms of bacteria found in contaminated water. Such chemicals are employed for treatment of water in swimming pools and water treatment plants, and reduce the bacteria in the water being treated to a level where the water is said to be drinkable.

Activated carbon filters are employed to remove particles which affect the taste of treated drinkable water but such filters do not remove bacteria from treated drinkable water or contaminated water.

It would be desirable to provide a small compact apparatus for field use survival which would process any source of contaminated water and produce drinkable bacteria free water.

SUMMARY OF THE INVENTION

It is a principal object of the present invention to provide a small cold sterilization apparatus.

It is another principal object of the present invention to provide a simple and inexpensive disposable apparatus for the removal of bacteria from contaminated water.

It is yet another object of the present invention to provide a flexible and foldable apparatus in which contaminated water can be scooped or poured and filtered to provide drinkable bacteria free water.

It is yet another object of the present invention to provide a self-contained water purification and storage device for drinking water.

According to these and other objects of the present invention there is provided a flexible collector for receiving contaminated water. The bottom of the collector is provided with a sub-micron porous bacteria filter. The contaminated water is forced by pressure through the bacteria filter where it is trapped in a holding chamber connected to the filter. Bacteria free exit means are connected to the holding chamber to permit removal of the bacteria free filtered water.

BRIEF DESCRIPTION OF THE DRAWINGS

FIG. 1 is an elevation in section of a preferred embodiment apparatus;

FIG. 2 is an elevation in section of a modified embodiment apparatus of the type shown in FIG. 1 which further includes a drinking tube;

FIG. 3 is a front elevation in section of a highly simplified embodiment apparatus which illustrates the operation of the present invention;

FIG. 4 is a side elevation in section of a simplified apparatus of the type shown in FIG. 3 and having a protective cover over the drinking tube;

FIG. 5 is a partial elevation in section of another type of protective cover attached to a filter and drinking tube; and FIG. 6 is an elevation in section of a semi-rigid bacteria free access cap for use with a protective cover.

DESCRIPTION OF THE PREFERRED EMBODIMENTS

The purpose of the preferred embodiments are to illustrate different features of the elements which comprise the present apparatus for removing bacteria from contaminated water. The elements in their preferred and modified forms may be exchanged from one embodiment to the other to meet requirements or needs of a specific use as will be explained hereinafter.

Not only is the apparatus adapted to remove both live and dead bacteria, but will remove all particles down to 0.2 microns which includes radioactive particles, but does not include chemicals in liquid solution which do not remain as particles after being dissolved.

FIG. 1 is a section in elevation showing schematically the preferred embodiment water purification apparatus 10. The flexible non-porous water collector 11 is preferably made in the form of a cylindrical sleeve from rupture resistant plastic. Such plastics are well known and may be one to twenty mils in thickness depending on their strength. Collector 11 is sealed to a semi-rigid annular plastic ring 12 which is provided with a downwardly projecting cylindrical portion 13. Removable cover or seal 14 is provided to keep out dirt before use. The collector 11 preferably has a capacity of at least one-half liter and can be made larger if required.

Filter 15 is preferably in the form of a circular sheet of sub-micron filter material. Such membrane filters are available from Gelman Sciences, Inc. and others with capacity to remove particles down to 0.2 microns ($\mu$m). Filter 15 is preferably attached to plastic ring 16 by ultrasonic welding or other means such as heat sealing or adhesives. Ring 16 is also sealed to the inner surface of plastic water collector 11, thus, any water entering collector 11 will be forced to pass through filter 15 to enter holding chamber 17. Holding chamber 17 includes a continuation portion of flexible plastic sleeve 18 as well as a portion of semi-rigid flange collar 19. Sleeve 18 is connected to upwardly projecting cylindrical portion 21 of collar 19. The exit or mouth portion 22 of collar 19 is preferably provided with a removable cover or seal 23 and like removable cover 14 is adapted to form a sterile seal which can be removed by pulling or tearing it away. In addition to cover 23 there is provided a semi-rigid protective cap 24 which slides over the lower part of cylindrical portion 21 of collar 19. Since sleeve portions 11, 18 are made of flexible plastics, the whole upper portion of apparatus 10 will fold inside of flange collar 19 permitting cylindrical portion 13 of ring 12 to also fit over the upper part of cylindrical portion 21 of collar 19. It will now be appreciated that total apparatus 10 can be folded together and stored in the form of a shallow cylinder. The relative dimensions of the parts of the elements are not drawn to scale to more clearly illustrate the cooperation of elements. The shallow cylinder of semi-rigid tough plastic could be made very small in depth while retaining the preferred mode of operation.

Contaminated water may be poured into water collector 11 or water may be scooped into the collector 11 after removal of cover 14. Collector 11 is then squeezed manually to create a minimum pressure of about one to five pounds per square inch, which is sufficient to force water through filter 15. Even if apparatus 10 is inverted, the filtered water in holding chamber 17 does not have sufficient pressure to again pass back through filter 15 to collector 11 and be lost. The filter 15 can be made to retain water at even higher pressures but the lower pressures without reverse loss is preferred for ease of operation.

Since holding chamber 17 was in a collapsed state, it is expanded by filtered water entering the chamber without the requirement of venting. One hundred square centimeters of filter area is sufficient to filter one liter per minute of contaminated water when employing a filter pore size of about 0.2 microns ($\mu$m). Since micro filtration filters tend to clog when the bacteria and particulate matter is about the same size as the pores of the filter, it is possible to add a prefilter (not shown) to the ring 16. In most circumstances where contaminated water is being filtered to provide drinking water, the apparatus 10 is only used once and is not clogged under such limited use.

Refer now to FIG. 2 showing a filter system 26 similar to the filter system 10. Elements which are identical or function equivalents are numbered the same as those same elements in FIG. 1. The plastic sleeve 18' is shown having preformed pleats 27. Cover 23' is shown as a removable cap capable of holding water in holding chamber 17 when mounted on exit portion 22 of collar 19. As explained hereinbefore, the water which passes through filter 15 into holding chamber 17 will not return freely through filter 15 without pressure. Thus, holding chamber 17 becomes a container which can be inverted to provide free access to flexible drinking tube 28. Alternatively, drinking water can be poured out of the exit mouth portion 22 or mouth portion 22 can be placed directly on the mouth as long as it has remained clean by proper use of cover 23' and cap 24. The water collector 11 is shown longer and without a cover 14 or stabilizing ring 12 as shown in FIG. 1. This structure makes it much easier to twist and squeeze water collector 11. Collector 11 need not be squeezed flat because a sufficient air pressure can be created above any water standing on filter 15 to force it into holding chamber 17. The sleeve 18 of the chamber 17 can be made sufficiently strong to permit it to serve as a flexible storage container which is storable with water inside.

Refer now to the simplified and modified embodiments shown in FIGS. 3 and 4. Sleeve 28 is a continuous plastic hollow sleeve terminating in a drinking tube 29. Filter 31 is connected to the inner surfaces about midway between the collector 32 and the holding chamber 33. This simplified design is adapted to be very light and to be folded into a package smaller than a package of cigarettes. Since the user may want to immerse the apparatus 34 into contaminated water in order to fill collector 32, a flexible cover 35 is provided over the holding chamber end. A removable cap or seal 36 is provided on the flexible cover 35 and is removed when access to drinking tube 29 is desired. A resilient clamp 37 is attached on the folded end of drinking tube 29 which is the only exit for holding chamber 33. Cover 35 and cap 36 provide tube 29 with complete protection from outside bacteria and are sealed by known techniques to sleeve 28.

FIG. 5 is a partial elevation in section of another type of protective cover attached to the holding chamber. Cover 35' may be torn away from drinking tube 29 at semi-rigid ring 38. Cover 35' is attached to ring 38 in a manner which forms a weakened structure in the material. Thus, cover 35' can be removed without touching and possibly contaminating tube 29 which is preferably folded and clamped inside cover 35' before use.

FIG. 6 shows another form of access cover or cap 39 which can be attached to either the flexible plastic covers like cover 35 or to the mouth 22 of the exit end of chambers 17 and 33. Stopper 41 fits inside access mouth 42 and also form a top seal over the mouth 42. A tab or tail 43 is provided which can be grasped without having to touch the mouth 42, thus, assuring that the inside of the mouth 42 is maintained clean.

Having explained two preferred embodiments of the present invention and one simplified embodiment and modifications thereof, it will be understood that the filter system will remove the smallest known bacteria particles which are about 0.3 or 0.4 microns in size. Most bacteria is much larger than one micron in size. Thus, the invention will have great utility for flood, fire and earthquake victims. The system in its preferred form will find use by hikers, campers, military personnel and for use in survival kits.

I claim:

1. A flexible and collapsible apparatus for producing bacteria free drinking water from contaminated water comprising:
   a sleeve shaped flexible non-porous contaminated water collector having a top open inlet end and a bottom closed filter end adapted to receive contaminated water therein,
   a sub-micron porous bacteria membrane filter permanently connected to said bottom closed filter end of said water collector,
   a flexible and expandable non-porous bacteria free holding chamber permanently connected to said bacteria filter and sealed on said water collection to form an axial extension of said water collector,
   said flexible water collector being adapted to be squeezed to generate a uniform force on top of said contaminated water in said collector and to force said contaminated water through said sub-micron filter and into said holding chamber where it accumulates by gravity, and
   bacteria free exit means connected to the bottom of said holding chamber for removing bacteria free drinking water from said holding chamber without subjecting said drinking water to said contaminated water.

2. Apparatus as set forth in claim 1 wherein said bacteria free exit means further comprises:
   a semi-rigid bacteria free flange collar connected to the bottom of said holding chamber, and
   a removable protective cap mounted over said flange collar for maintaining the portions of said flange collar under said protective cap bacteria free when said flexible apparatus is immursed in bacteria laden water.

3. Apparatus as set forth in claim 2 wherein said flange collar further comprises an outlet, and a removable seal mounted over the outlet of said flange collar inside of said removable protective cap.

4. Apparatus as set forth in claim 2 which further includes a semi-rigid ring connected to said top open inlet end of said flexible non-porous contaminated water collector.

5. Apparatus as set forth in claim 4 which further includes a second removable seal mounted over the opening of said semi-rigid ring.

6. Apparatus as set forth in claim 5 wherein said semi-rigid ring has an annular projection for coaxially coupling to said flange collar when said flexible apparatus is collapsed.

7. Apparatus as set forth in claim 2 which further includes a flexible drinking tube mounted and extending from said holding chamber.

8. Apparatus as set forth in claim 1 which further includes a drinking tube connected to said bacteria free exit means.

9. Apparatus as set forth in claim 8 which further includes a flexible protector mounted over said drinking tube.

10. Apparatus as set forth in claim 9 which further includes a removable seal mounted over an aperture in said flexible protector.

* * * * *